US005523129A

United States Patent [19]

McGeehan-Hatch

[11] Patent Number: 5,523,129

[45] Date of Patent: Jun. 4, 1996

[54] REMOVABLE SCENE-SCAPES BORDERED BY AN INTERCHANGEABLE WINDOW FRAME FOR DECORATING THE WALLS OF CHILDREN'S ROOMS

[76] Inventor: Mary Kate McGeehan-Hatch, 4323 Shady Glade Ave., Studio City, Calif. 91604

[21] Appl. No.: 195,182

[22] Filed: Feb. 14, 1994

[51] Int. Cl.$^6$ .............................. B32B 31/04; B44C 5/04

[52] U.S. Cl. ............................ 428/13; 428/39; 428/100; 428/904.4

[58] Field of Search ................................ 428/7, 14, 13, 428/39, 100, 904.4; 446/82

[56] References Cited

U.S. PATENT DOCUMENTS

| | | | |
|---|---|---|---|
| 288,294 | 11/1883 | Baldwin | 428/904.4 X |
| 1,648,020 | 11/1927 | Labram | 428/39 |
| 1,721,615 | 7/1929 | Cook | 428/904.4 X |
| 1,809,378 | 6/1931 | Eschenbach | 40/438 |
| 1,900,987 | 3/1933 | Goff | 428/904.4 X |
| 2,019,098 | 10/1935 | Schrickel | 428/39 |
| 3,447,274 | 6/1969 | Davidson | 428/14 X |
| 3,886,677 | 6/1975 | Behring et al. | 428/39 X |
| 4,225,369 | 9/1980 | Felchlin | 428/904.4 X |
| 4,584,218 | 4/1986 | Travis | 428/40 |
| 4,900,604 | 2/1990 | Martinez et al. | 428/79 |
| 5,075,141 | 12/1991 | Sudmann | 428/14 |
| 5,118,318 | 6/1992 | Lorizio | 446/72 |
| 5,196,246 | 3/1993 | Kauss et al. | 428/39 |
| 5,197,213 | 3/1993 | Borden | 428/14 X |

*Primary Examiner*—Henry F. Epstein
*Attorney, Agent, or Firm*—Thomas I. Rozsa; Tony D. Chen

[57] ABSTRACT

A wall decorating system, comprising a multiplicity of multi-layer imitated window scenery sets. Each imitated window scenery set further comprising a large background scene-scape, a large foreground scene-scape, several small foreground scene-scapes, and a large imitated window frame. The large background scene-scape is painted with a background scene which is unique for the each set, the large foreground scene-scape has an outline of and is painted with a particular foreground scene, the small foreground scene-scapes also have outlines of and are painted with particular small foreground objects, and the large imitated window frame has a central opening surrounded by a circumferential border painted with a unique window frame structure. The imitated window scenery set may be held together and to an interior wall of a child's room by pressure sensitive adhesive and/or filamentary hook and loop type fasteners to create various imitated windows, where the frame and scenery view of the imitated windows can be interchanged as desired.

19 Claims, 3 Drawing Sheets

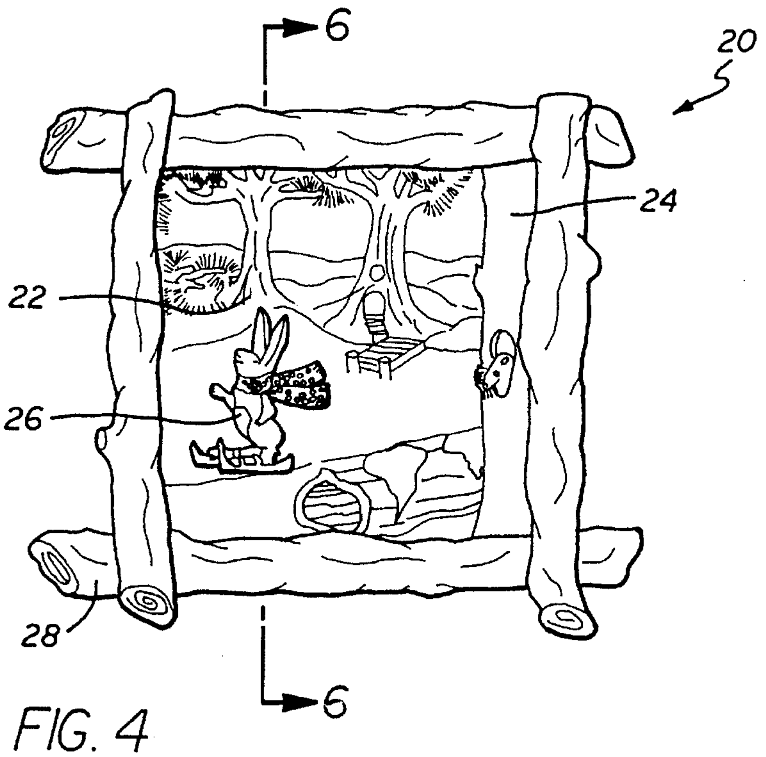
FIG. 4
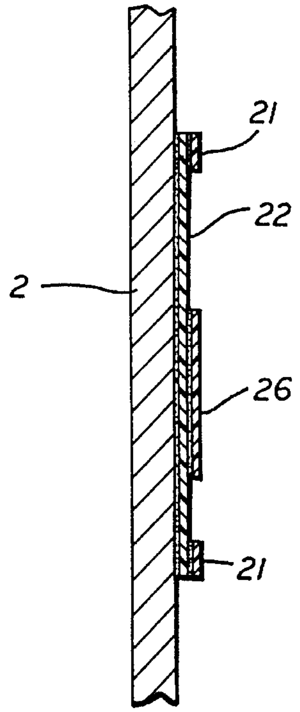
FIG. 6
FIG. 5
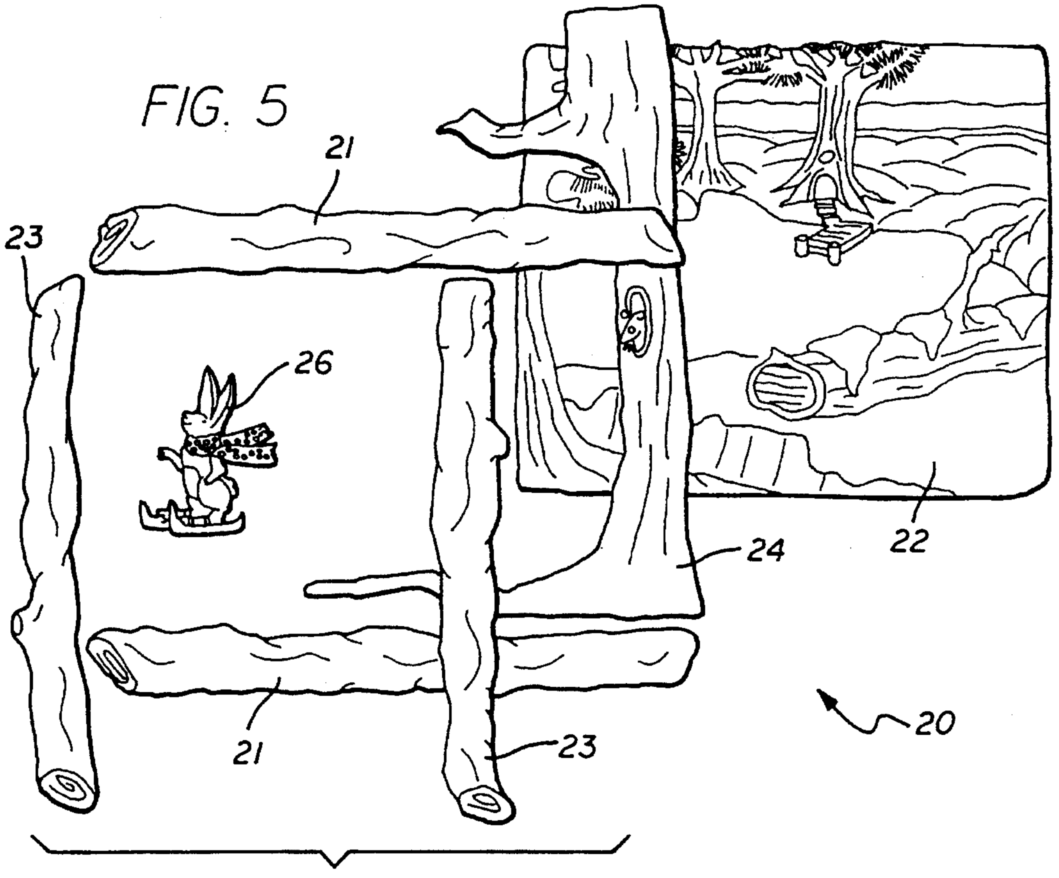

REMOVABLE SCENE-SCAPES BORDERED BY AN INTERCHANGEABLE WINDOW FRAME FOR DECORATING THE WALLS OF CHILDREN' S ROOMS

BACKGROUND OF THE INVENTION

1. Field of The Invention

The present invention relates to the field of decoration of interior walls. More particularly, the present invention relates to the field of removable scene-scrapes for decorating the walls of children's rooms.

2. Description of The Prior Art

The interior walls of children's rooms are often colorfully decorated. The conventional decorations typically involve either wallpapering or painting scenes on the walls. However, while the wallpapering or painting scenes on the walls may be attractive, one major problem is that they are permanent and cannot be easily removed. Clearly, children's moods change and it would be more desirable to be able to decorate the wall by having removable scenes.

Recently a wall decorating system with removable scenes has been developed. The system usually includes an elongated band affixed on the walls around a child's room at a height which is reachable by the child, and a multiplicity of small cut-out pieces such as animals or cartoon figures which can be removably adhered onto the elongated band. While this type of decorating system provides the desired flexibility, it does not provide a large scale decoration which offers a cohesive scenery system.

The following nine (9) prior art references were found to be relevant to the field of the present invention:

1. U.S. Pat. No. 1,648,020 issued to Labram on Nov. 8, 1927 for "Wall Decoration" (hereafter "the Labram Patent").
2. U.S. Pat. No. 1,809,378 issued to Eschenbach on Jun. 9, 1931 for "Interchangeable Block Billboard" (hereafter "the Eschenbach Patent").
3. U.S. Pat. No. 3,447,274 issued to Davidson on Jun. 3, 1969 for "Scenery System" (hereafter "the Davidson Patent").
4. U.S. Pat. No. 4,584,218 issued to Travis on Apr. 22, 1986 for "Wall Ornament For Shower And Bathtub Enclosures" (hereafter "the Travis Patent").
5. U.S. Pat. No. 4,900,604 issued to Martinez et al. on Feb. 13, 1990 for "Adhesive Wall Decorating System" (hereafter "the Martinez Patent").
6. U.S. Pat. No. 5,075,141 issued to Sudmann on Dec. 24, 1991 for "Decorative Strips For Shower Partitions" (hereafter "the Sudmann Patent").
7. U.S. Pat. No. 5,118,318 issued to Lorizio on Jun. 2, 1992 for "Security Object System" (hereafter "the Lorizio Patent").
8. U.S. Pat. No. 5,196,246 issued to Kauss et al. on Mar. 23, 1993 for "Wall Decorating System" (hereafter "the Kauss Patent").
9. U.S. Pat. No. 5,197,213 issued to Borden on Mar. 30, 1993 for "Decorative Framing Border Or Enclosure Device" (hereafter "the Borden Patent").

The Labram Patent discloses a wall decoration. It includes a background unit of wallpaper with a scenic picture appearing on the wallpaper. The scenic picture is small so as to give the impression that it is located at a distance from the observer. Additional objects such as a tree or the like are larger than any other single object in the background decoration so that when the objects are superimposed upon the wallpaper, the objects will stand out and will combine with the remainder of the decoration to impart to the whole a perspective effect with the object forming the foreground of the picture.

The Davidson Patent discloses a scenery system. It includes a continuous picture which is made up of three modular panels. These panels are held in place in their lower ends by a channel which is attached to the floor of the room. The panels fit into vertical edge guides. These edge guides have channels with a fore-and-aft thickness sufficient to receive the edge portions of the panels. A multiplicity of substitute panels can be used to interchange the panels when a change in scene is desired.

The Travis Patent discloses a wall ornament for shower and bathtub enclosures. It includes a waterproof ornament or poster adapted for mounting upon the wall of a tub or shower enclosure. The photo is imprinted with a special moisture-proof, water-resistant ink upon a sheet of synthetic paper which essentially includes an extruded polypropylene film.

The Martinez Patent discloses an adhesive wall decorating system. It includes self-appliques conveniently pressed onto substrate sheets to create a decorative wall scene. The decorative scene can subsequently be changed by peeling off the appliques and repositioning them on the substrate sheets.

The Kauss Patent discloses a wall decorating system. The Kauss Patent is similar to the Martinez Patent but with an improved flexible and conformable ionomeric resin-based sheet material to construct the appliques and backing sheets.

The Eschenbach Patent discloses an interchangeable billboard. It includes a frame and a multiplicity of interchangeable box units adapted to be placed adjacent to each other and detachably secured in the frame so their pictorial sides are aligned with the front surface of the frame.

The Sudmann Patent discloses decorative strips for shower partitions. It includes a bent tube which, with framework connectors and a base part, is formed into a frame. The glass filling is held by special frame profiles extending from the tube. The decorative strips are clipped onto the framework profile and the wall strip.

The Lorizio Patent discloses a security object system. It includes a pillowcase provided with renderings of a home; and mother and father figures are provided with detachable pockets adapted to hold the removable male and female dolls bearing a familial resemblance to the figures rendered on the pillowcase. The system is used by providing an infant with the pillow and doll as a security object.

The Borden Patent discloses a decorative framing border or enclosure device. It includes a transparent or translucent polymeric decorative framing border or enclosure device which can enclose a picture or the like.

It can be seen that although the general concept of using removable self-adhesive appliques to decorate children's room has been disclosed by various prior art patents, the cited prior art references fail to teach a series of different window frames and a series of different inside scenes which can be interchangeably combined and affixed to the walls of children's rooms to form imitated window scenes for children's rooms. It is therefore desirable to have a new system with removable scene-scapes bordered by an imitated window frame for decorating the walls of children's rooms, where the scene-scapes are interchangeable.

SUMMARY OF THE INVENTION

The present invention is a wall decorating system with removable scene-scapes bordered by interchangeable window frames for decorating the walls of children's rooms. In the present invention, the phrase "scene-scape" means a generally flat thin panel having scenery or other types of visual artwork painted or printed on the front surface of the panel.

It is known that it is desirable to decorate the interior walls of children's rooms with interesting ornaments. It is also know that one type of conventional decoration involves pasting wallpaper or painting scenes on the walls of children's rooms. The disadvantage of this type of wall decorating systems is that it is permanent in nature, and cannot be changed frequently to accommodate the changing mood and desire of small children.

It is further known that a removable wall decorating system has been developed in recent years, which typically has an elongated band affixed on the walls around a child's room and a multiplicity of small cut-out pieces or appliques. The small appliques can be removably or detachably adhered onto the elongated band. The disadvantage of this type of decorating systems is that it does not provide a large scale decoration which offers a cohesive scenery system.

It has been discovered, according to the present invention, that if a wall decorating system is provided for decorating the walls of children's rooms, which includes large scale, real window sized scene-scapes, then when such large scale, real window sized scene-scapes are affixed to the wall of a child's room, it can offer actual sized imitated window scenes which will make the child's room more interesting and spectacular to the child.

It has also been discovered, according to the present invention, that if a wall decorating system is provided for decorating the walls of children's rooms, which includes large scale, real window sized imitated window frames which can be placed over the large scale, real window sized scene-scapes, then the scene-scapes can be viewed as through a window of a particular type of building, such as a castle or a cabin, as it is depicted by the respective imitated window frame, and the scene-scapes can be interchangeable to show a different scenery.

It has further been discovered, according to the present invention, that if a wall decorating system is provided for decorating the walls of children's rooms, which includes a multi-layer assembly comprised of a large background panel affixed to the wall of a child's room for providing a background scene, a middle foreground piece affixed to the background panel for providing foreground sceneries such as trees, flowers, etc., and several small front pieces affixed to the background panel and surrounded by the foreground piece for adding small objects such as animals or cartoon figures to the scenery background, then when the imitated window frame is placed over the multi-layer assembly, the thickness of the foreground piece and the window frame will create an in-depth three-dimensional visual effect.

It has additionally been discovered, according to the present invention, that if a wall decorating system is provided for decorating the walls of children's rooms, where an imitated window frame is affixed to a wall of a child's room in such a manner that a small clearance is maintained between the frame and the wall which forms a slot, and the frame has a bottom tray to close the slot from the bottom, then a scenery background panel can be inserted into the slot and supported by the tray, which makes it very convenient to interchange the background scenery panel by simply removing one background scenery panel from the slot and replacing it with another background scenery panel.

It is therefore an object of the present invention to provide a wall decorating system for decorating the walls of children's rooms, which includes large scale, real window sized scene-scapes, so that when such large scale, real window sized scene-scapes are affixed to the wall of a child's room, it can offer actual sized imitated window scenes which will make the child's room more interesting and spectacular to the child.

It is another object of the present invention to provide a wall decorating system for decorating the walls of children's rooms, which includes large scale real window sized imitated window frames that can be placed over the large scale, real window sized scene-scapes, so that the scene-scapes can be viewed as through a window of a particular type of building, such as a castle or a cabin, as it is depicted by the respective imitated window frame, and the scene-scapes can be interchangeable to show a different scenery.

It is also an object of the present invention to provide a wall decorating system for decorating the walls of children's rooms, which includes a multi-layer assembly comprised of a large background panel affixed to the wall of a child's room for providing a background scene, a middle foreground piece affixed to the background panel for providing foreground sceneries such as trees, flowers, etc., and several small front pieces affixed to the background panel and surrounded by the foreground piece for adding small objects such as animals or cartoon figures to the scenery background, so that when the imitated window frame is placed over the multi-layer assembly, the thickness of the foreground piece and the window frame will create an in-depth three-dimensional visual effect.

It is a further object of the present invention to provide a wall decorating system for decorating the walls of children's rooms, where an imitated window frame is affixed to a wall of a child's room in such a manner that a small clearance is maintained between the frame and the wall which forms a slot, and the frame has a bottom tray to close the slot from the bottom, then a scenery background panel can be inserted into the slot and supported by the tray, which makes it very convenient to interchange the background scenery panel by simply removing one background scenery panel from the slot and replacing it with another background scenery panel.

It is an additional object of the present invention to provide a wall decorating system for decorating the walls of children's rooms, where the components of the system can be easily manufactured at low costs.

Described generally, the present invention is a wall decorating system comprising a multiplicity of multi-layer imitated window scenery sets. Each imitated window scenery set further comprises a large background scene-scape, a large foreground scene-scape, one or more small foreground scene-scapes, and a large imitated window frame. The large background scene-scape is painted with a background scene which is unique for each set. The large foreground scene-scape has an outline of and is painted with a particular foreground scene. The small foreground scene-scapes also have outlines of and are painted with particular small foreground objects. The large imitated window frame has a central opening surrounded by a circumferential border painted with a unique window frame structure. The imitated window scenery set can be detachably attached together and to an interior wall of a child's room by pressure sensitive adhesive (PSA) and/or filamentary hook and loop type fasteners to create various imitated windows, where the frame and scenery view of the imitated windows can be interchanged as desired.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 4 is an illustrative view of another multi-layer imitated window scenery set of the present invention wall decorating system for decorating the walls of children's rooms.

FIG. 5 is an exploded view of the multi-layer imitated window scenery set of the present invention wall decorating system shown in FIG. 4.

FIG. 6 is a cross-sectional view taken along line 6—6 of FIG. 4.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a wall decorating system primarily for decorating the walls of children's rooms. Of course the present invention wall decorating system may also be utilized for other types of rooms, such as adults' rooms, offices, etc. The present invention wall decorating system comprises a multiplicity of such multi-layer imitated window scenery sets. Each set further comprises a large background scene-scape, one or more large foreground scene-scapes, one or more small foreground scene-scapes, and a large imitated window frame. These pieces can be made of any suitable material, such as plastic, paper, cardboard, wood or fabric materials.

Figure 1:
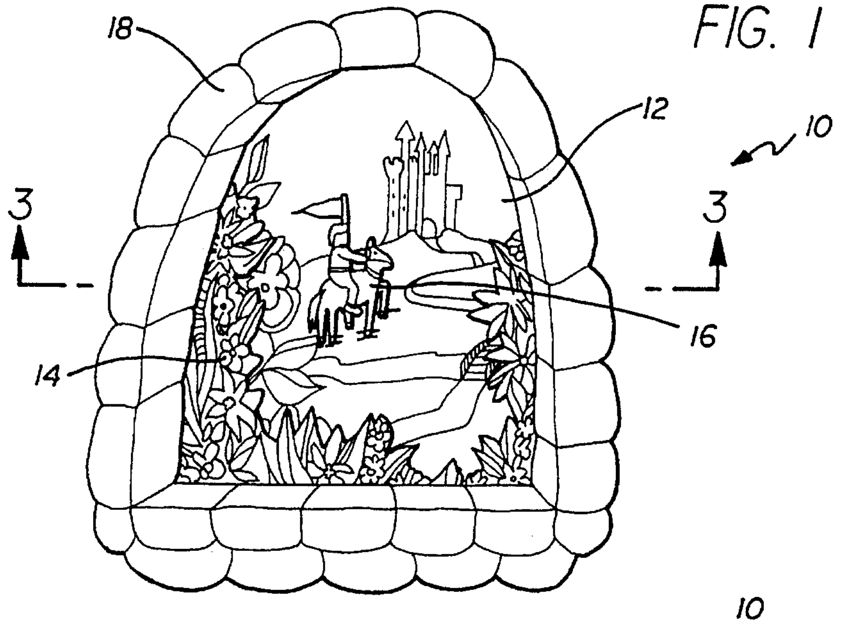
FIG. 1 is an illustrative view of a multi-layer imitated window scenery set of the present invention wall decorating system for decorating the walls of children's rooms.
Figure 3:
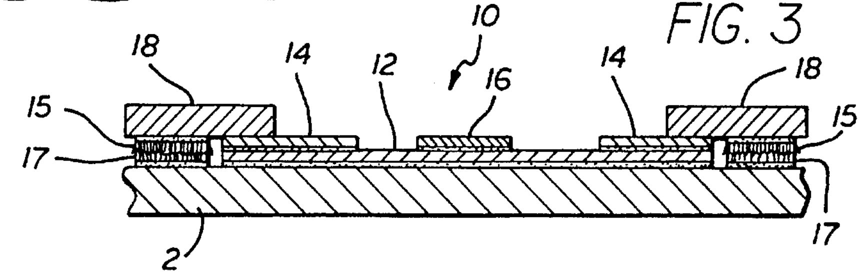
FIG. 3 is a cross-sectional view taken along line 3—3 of FIG. 1.
Figure 2:
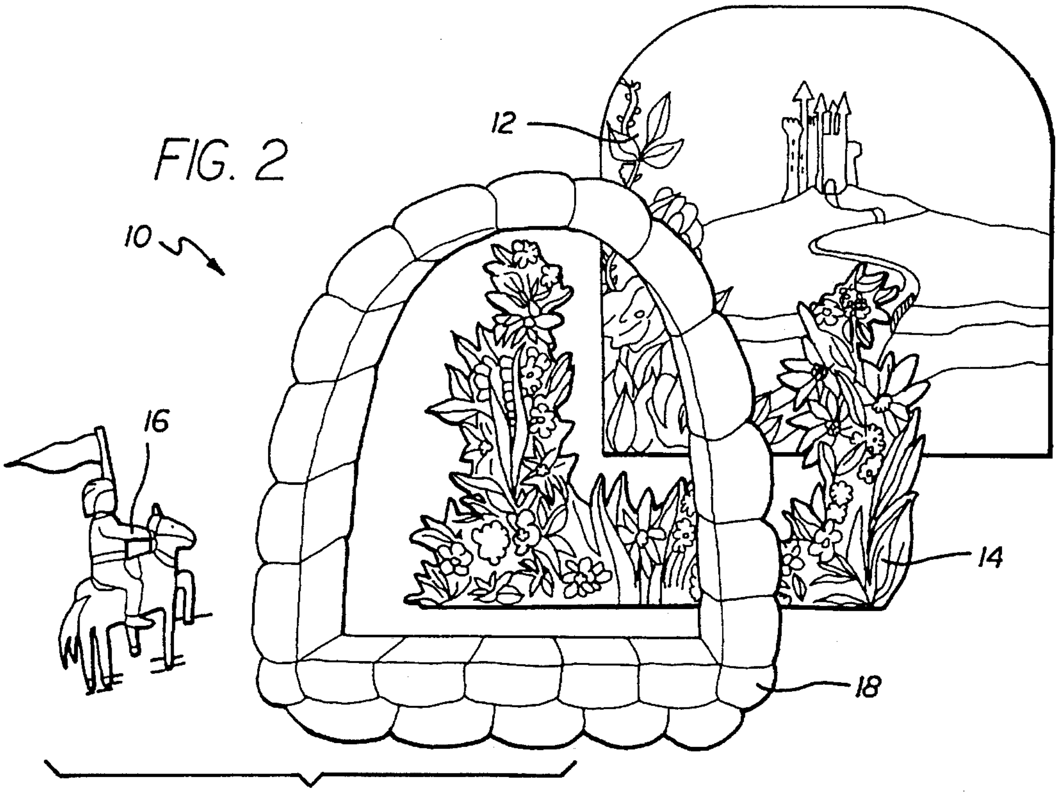
FIG. 2 is an exploded view of the multi-layer imitated window scenery set of the present invention wall decorating system shown in FIG. 1.

Referring to FIGS. 1 through 3, there is shown a multi-layer imitated window scenery set 10 of the present invention wall decorating system. The multi-layer imitated window scenery set 10 includes a large background scene-scape 12, a large foreground scene-scape 14, one or more small foreground scene-scapes 16, and a large imitated window frame 18.

The large background scene-scape 12 has a real window sized and shaped configuration. It has a front side and a back side. The front side is painted with a background scene which is unique for each scenery set. In this example the background scene is a castle on the top of a small hill. The back side is provided with pressure-sensitive adhesive (PSA) for removably affixing the large background scene-scape 12 to an interior wall 2 of a room. The strength of the PSA allows the large background scene-scape 12 to be pressed-on to the wall 2 or peeled-off therefrom when desired.

The multi-layer imitated window scenery set 10 may include one or more pieces of large foreground scene-scapes. In this example, it includes one large foreground scene-scape 14. The large foreground scene-scape 14 has an outline of a particular foreground scene. It also has a front side and a back side. The front side is painted with the particular foreground scene. In this example the foreground scenery is wild flowers. The back side is provided with PSA for removably affixing the large foreground scene-scape 14 to the front side of the large background scene-scape 12, such that the foreground scene of the large foreground scene-scape 14 is superimposed on the background scene of the large background scene-scape 12. The strength of the PSA allows the large foreground scene-scape 14 to be pressed-on to the large background scene-scape 12 or peeled-off therefrom when desired.

The multi-layer imitated window scenery set 10 may include one or more pieces of small foreground scene-scapes. In this example it includes one small foreground scene-scape 16. The small foreground scene-scape 16 has a front side and a back side. It also has an outline of a particular small foreground object, and its front side is painted with the particular small foreground object. In this example the small foreground object is a knight on a horse. The back side is provided with PSA for removably affixing the small foreground scene-scape 16 to the front side of the large background scene-scape 12, such that it is superimposed thereon. The strength of the PSA allows the small foreground scene-scape 16 to be pressed-on to the large background scene-scape 12 or peeled-off therefrom when desired.

The large imitated window frame 18 has a large central opening which is surrounded by a circumferential border. The border has a front side and a back side. The front side is painted with a unique window frame structure. In this example it is a window frame of a palace or castle. The back side is provided with filamentary hook and loop type fasteners 15 and 17, commonly known as VELCRO-R fasteners. Two filamentary fasteners 15 are affixed in parallel on the back side of the frame 18, and two complementary mating filamentary fasteners 17 are affixed in parallel on the wall 2. The frame 18 can be then affixed to the wall 2 by pressing filamentary fasteners 15 onto filamentary fasteners 17. The thickness of each pair of fasteners 15 and 17 creates clearance for the large background scene-scape 12 and large foreground scene-scape 14, and also creates an in depth view of the unique background scenery 12, the particular foreground scenery 14 and the small foreground object 16, which can be seen through the central opening of frame 18.

When the multi-layer imitated window scenery set 10 is affixed to the wall 2 of a child's room, it offers actual sized imitated window scenes which makes the child's room more interesting and spectacular to the child. The thickness of the large foreground scene-scape 14 and the thickness of the large imitated window frame 18 also serve the function of creating an in-depth three-dimensional visual effect. The small foreground scene-scape 16 can be peeled-off and re-pasted at a different spot as the child desires.

Referring to FIGS. 4 through 6, there is shown another multi-layer imitated window scenery set of the present invention wall decorating system for decorating the walls of children's rooms. Similar to the multi-layer imitated window scenery set 10 shown in FIGS. 1 through 3, the multi-layer imitated window scenery set 20 includes a large background scene-scape 22, a large foreground scene-scape 24, one or more small foreground scene-scapes 26, and a large imitated window frame 28. However, there are certain variations of the present invention which are illustrated in FIGS. 4 through 6.

First, as shown in FIG. 4, the multi-layer imitated window scenery set 20 presents a different scene. The large background scene-scape 22 shows a winter scene in a forest, the large foreground scene-scape 24 depicts a large tree, the small foreground scene-scapes 26 is a small rabbit on skates, and the large imitated window frame 28 imitates a window frame of a small cabin.

Secondly, as shown in FIG. 5, the large imitated window frame 28 may be formed of multiple pieces. For example, it can be formed by using two horizontal "logs" 21 and two vertical "logs" 23. This feature makes it possible to adjust the dimension of the large imitated window frame 28. For example, for a wider or narrower background scene-scape the distance between the two vertical "logs" 23 can be increased or decreased. Similar adjustment can be made with regard to the two horizontal "logs" 21. This feature also makes it possible to adjust the shape of the large imitated window frame 28. For example, a child can form a triangular shaped window frame by using three "logs", or form a pentagon shaped window frame by using five "logs", and so on.

Thirdly, as shown in FIG. 6 in comparison with FIG. 3, the devices used for affixing the frame to the wall is different. In FIG. 3, filamentary hook and loop type of fasteners are used. In FIG. 6, PSA is used.

One of the most important features of the present invention is that the window sized scene-scapes and the imitated window frames are interchangeable. For example, the scene-scapes of a first imitated window scenery set can be interchanged with the scene-scapes of a second imitated window scenery set but with the frame unchanged.

In addition, not only the frame but also the foreground pieces can be interchangeable in the present invention wall decoration system. A large foreground scene-scape can be used with different suitable background scene-scapes to create different sceneries. Similarly, a small foreground object can be pasted on different suitable background scene-scapes to make different impressions.

Figure 7:
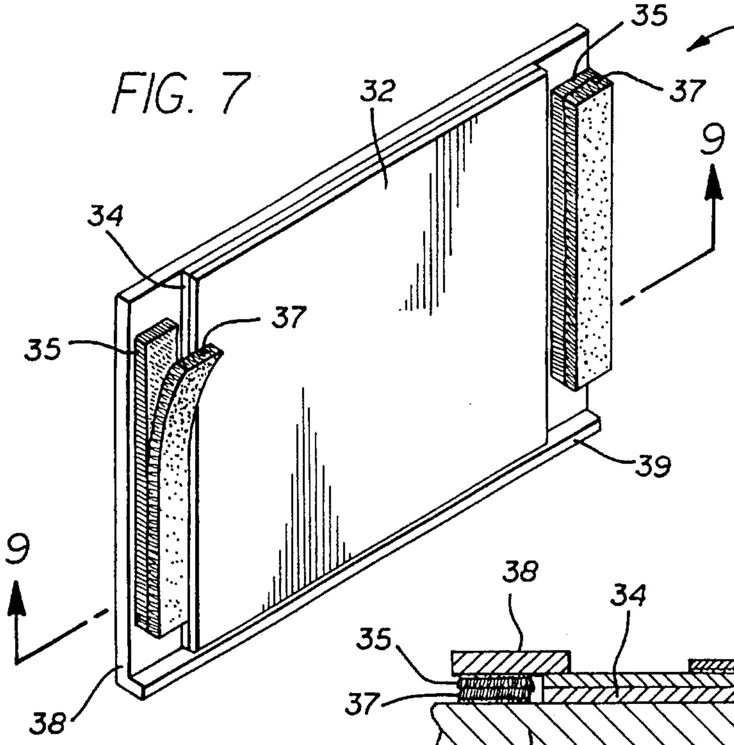
FIG. 7 is an illustrative view of still another multi-layer imitated window scenery set of the present invention wall decorating system for decorating the walls of children's rooms.
Figure 9:
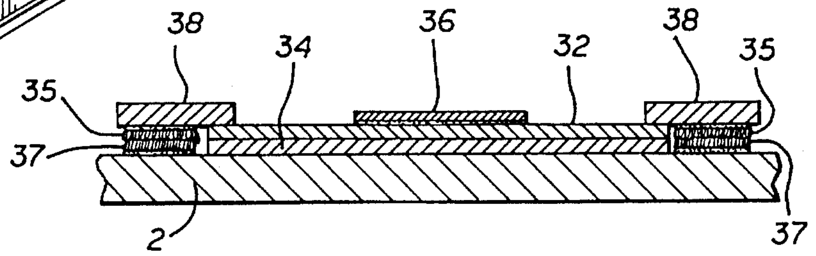
FIG. 9 is a cross-sectional view taken along line 9—9 of FIG. 7.
Figure 8:
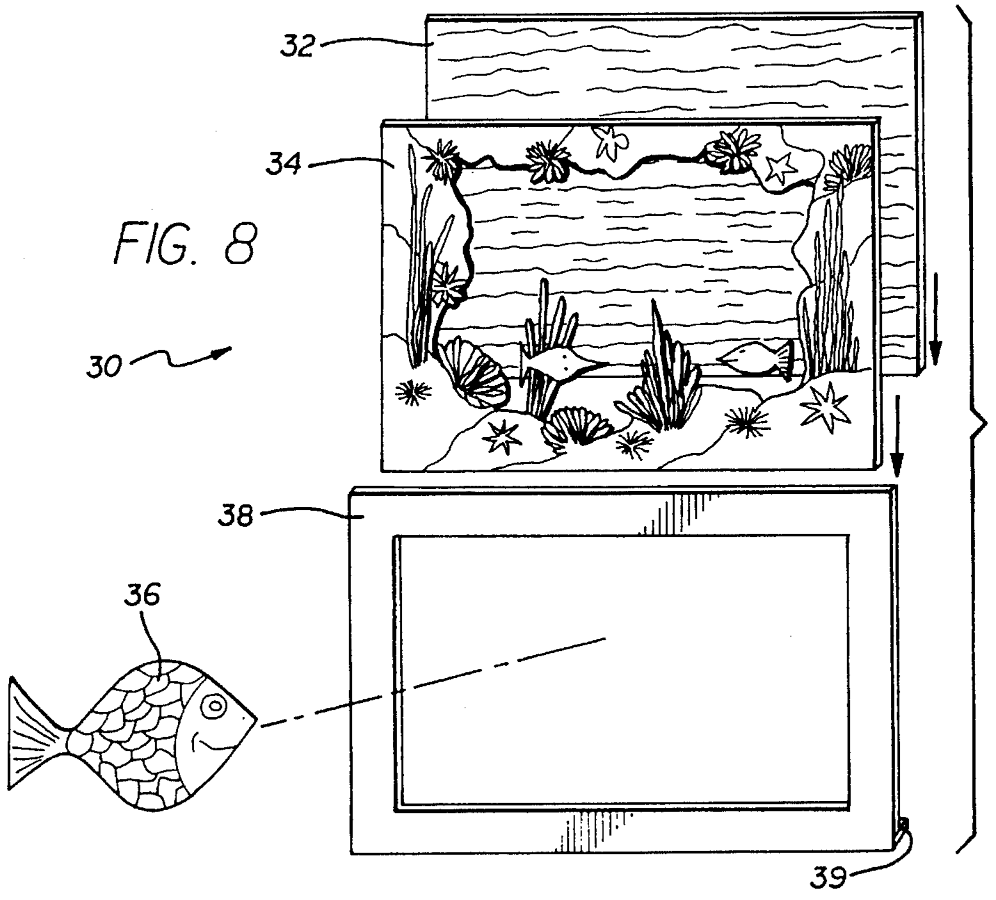
FIG. 8 is an exploded view of the multi-layer imitated window scenery set of the present invention wall decorating system shown in FIG. 7.

Referring to FIGS. 7 through 9, there is shown another alternative embodiment of the multi-layer imitated window scenery set of the present invention wall decorating system for decorating the walls of children's rooms. Similar to the multi-layer imitated window scenery sets 10 and 20 shown before, the multi-layer imitated window scenery set 30 shown here includes a large background scene-scape 32, a large foreground scene-scape 34, one or more small foreground scene-scapes 36, and a large imitated window frame 38.

The back side of the frame 38 is again provided with filamentary hook and loop type fasteners 35 and 37. Two filamentary fasteners 35 are affixed in parallel on the back side of the frame 38, and two complementary mating filamentary fasteners 37 are affixed in parallel on the wall 2. The frame 38 can be then affixed to the wall 2 by pressing filamentary fasteners 35 onto filamentary fasteners 37.

There is no PSA provided on the back sides of the large background scene-scape 32 and the large foreground scene-scape 34. Instead, a bottom tray 39 is provided on the back side of the imitated window frame 38. Since the thickness of the filamentary fasteners 35 and 37 creates a clearance between the wall 2 and the back side of the frame 38, the large background scene-scape 32 and the large foreground scene-scape 34 can be simply inserted therein, and held in position by the bottom tray 39. This alternative embodiment of the present invention makes it easier to interchange the background and foreground scene-scapes from frame to frame. Of course the small foreground scene-scape 36 still have PSA on its back side so that it can be affixed to the large background scene-scape 32.

It is understood that there may be many other variations of the present invention imitated scenery window sets, including many variations of the ways to affix the scene-scapes together or to the wall. For example, the shape and the number of scene-scape layers and the imitated window frames can be easily modified to suit different scenery views and other existing decorations of a child's room. In addition, there can be many alternative ways of which the imitated scenery window sets are detachably or removably attached or affixed to the wall of the child's room.

Defined in detail, the present invention is a wall decorating system, comprising: (a) a multiplicity of multi-layer imitated window scenery sets, each set further comprising a large background scene-scape, a large foreground scene-scape, a plurality of small foreground scene-scapes, and a large imitated window frame; (b) the large background scene-scape having a real window sized and shaped configuration and having a front side and a back side, the front side painted with a background scene which is unique for the each set, and the back side provided with pressure-sensitive adhesive for removably affixing the large background scene-scape to an interior wall of a room; (c) the large foreground scene-scape having an outline of a particular foreground scene and having a front side and a back side, the front side painted with the particular foreground scene, and the back side provided with pressure-sensitive adhesive for removably affixing the large foreground scene-scape to the front side of the large background scene-scape; (d) the plurality of small foreground scene-scapes each having an outline of a particular small foreground object and having a front side and a back side, the front side painted with the particular small foreground object, and the back side provided with pressure-sensitive adhesive for removably affixing the each small foreground scene-scape to the front side of the large background scene-scape; (e) the large imitated window frame having a large central opening surrounded by a circumferential border which has a front side and a back side, the front side painted with a unique window frame structure, and the back side provided with filamentary hook and loop type fasteners for removably affixing the large imitated window frame to said interior wall, such that the unique background scene, the particular foreground scene and the plurality of small foreground objects can be seen through the central opening; and (f) the large imitated window frames of the multiplicity of multi-layer imitated window scenery sets having substantially similar overall dimensions and being interchangeable for creating different combinations of window frame and scenery view; (g)

whereby the multiplicity of multi-layer imitated window scenery sets can be used to form various real sized imitated windows on the interior walls of the room, where the frame and scenery view of the imitated windows can be interchanged as desired.

Alternatively defined in detail, the present invention is a wall decorating system, comprising: (a) a multiplicity of multi-layer imitated window scenery sets, each set further comprising a large background scene-scape, a large foreground scene-scape, a plurality of small foreground scene-scapes, and a large imitated window frame; (b) the large background scene-scape having a real window sized and shaped configuration and having a front side and a back side, the front side painted with a background scene which is unique for the each set, and the back side provided with pressure-sensitive adhesive for removably affixing the large background scene-scape to an interior wall of a room; (c) the large foreground scene-scape having an outline of a particular foreground scene and having a front side and a back side, the front side painted with the particular foreground scene, and the back side provided with pressure-sensitive adhesive for removably affixing the large foreground scene-scape to the front side of the large background scene-scape; (d) the plurality of small foreground scene-scapes each having an outline of a particular small foreground object and having a front side and a back side, the front side painted with the particular small foreground object, and the back side provided with pressure-sensitive adhesive for removably affixing the each small foreground scene-scape to the front side of the large background scene-scape; (e) the large imitated window frame including a plurality of border pieces each having a front side and a back side, the front side painted with a respective portion of a unique window frame structure, and the back side provided with pressure-sensitive adhesive for removably affixing the piece to the front side of the large background scene-scape, the plurality of border pieces forming a large imitated window frame surrounding a large central opening, such that the unique background scene, the particular foreground scene and the plurality of small foreground objects can be seen through the central opening; and (f) the large imitated window frames of the multiplicity of multi-layer imitated window scenery sets having substantially similar overall dimensions and being interchangeable for creating different combinations of window frame and scenery view; (g) whereby the multiplicity of multi-layer imitated window scenery sets can be used to form various real sized imitated windows on the interior walls of the room, where the frame and scenery view of the imitated windows can be interchanged as desired.

Further alternatively defined in detail, the present invention is a wall decorating system, comprising: (a) a multiplicity of multi-layer imitated window scenery sets, each set further comprising a large background scene-scape, a large foreground scene-scape, a plurality of small foreground scene-scapes, and a large imitated window frame; (b) the large background scene-scape having a real window sized and shaped configuration and having a front side and a back side, the front side painted with a background scene which is unique for the each set; (c) the large foreground scene-scape having an outline of a particular foreground scene and having a front side and a back side, the front side painted with the particular foreground scene; (d) the plurality of small foreground scene-scapes each having an outline of a particular small foreground object and having a front side and a back side, the front side painted with the particular small foreground object, and the back side provided with pressure-sensitive adhesive for removably affixing the each small foreground scene-scape to the front side of the large background scene-scape; (e) the large imitated window frame having a large central opening surrounded by a circumferential border which has a front side and a back side, the front side painted with a unique window frame structure, and the back side having filamentary hook and loop type fasteners for removably affixing the large imitated window frame to an interior wall of a room, the filamentary hook and loop type fasteners having a thickness which creates a clearance between the wall and the back side of the frame for inserting the large background scene-scape and the large foreground scene-scape therein, the back side of the frame further having a bottom tray for holding the large background scene-scape and the large foreground scene-scape, such that the unique background scene, the particular foreground scene and the plurality of small foreground objects can be seen through the central opening; and (f) the large imitated window frames of the multiplicity of multi-layer imitated window scenery sets having substantially similar overall dimensions and being interchangeable for creating different combinations of window frame and scenery view; (g) whereby the multiplicity of multi-layer imitated window scenery sets can be used to form various real sized imitated windows on the interior walls of the room, where the frame and scenery view of the imitated windows can be interchanged as desired.

Defined broadly, the present invention is a wall decorating system, comprising: (a) a multiplicity of multi-layer imitated window scenery sets, each set further comprising a large background scene-scape, and a large imitated window frame; (b) the large background scene-scape painted with a background scene which is unique for the each set; (c) the large imitated window frame having a central opening surrounded by a circumferential border which has a front side and a back side, the front side painted with a unique window frame structure; (d) means for detachably connecting each the imitated window scenery set as a unit and removably affixing the unit to a wall of a building structure such that the unique background scene can be seen through the central opening of the unique imitated window frame; and (e) the large imitated window frames of the multiplicity of multi-layer imitated window scenery sets being interchangeable for creating different combinations of window frame and scenery view; (f) whereby the multiplicity of multi-layer imitated window scenery sets can be used to form various imitated windows on the interior walls of the room, where the frame and scenery view of the imitated windows can be interchanged as desired.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A wall decorating system, comprising:

a. a multiplicity of multi-layer imitated window scenery sets, each set further comprising a large background scene-scape, a large foreground scene-scape, a plurality of small foreground scene-scapes, and a large imitated window frame;

b. said large background scene-scape having a real window sized and shaped configuration and having a front side and a back side, the front side painted with a background scene which is unique for said each set, and the back side provided with pressure-sensitive adhesive for removably affixing said large background scene-scape to an interior wall of a room;

c. said large foreground scene-scape having an outline of a particular foreground scene and having a front side and a back side, the front side painted with the particular foreground scene, and the back side provided with pressure-sensitive adhesive for removably affixing said large foreground scene-scape to said front side of said large background scene-scape;

d. said plurality of small foreground scene-scapes each having an outline of a particular small foreground object and having a front side and a back side, the front side painted with the particular small foreground object, and the back side provided with pressure-sensitive adhesive for removably affixing said each small foreground scene-scape to said front side of said large background scene-scape;

e. said large imitated window frame having a large central opening surrounded by a circumferential border which has a front side and a back side, the front side painted with a unique window frame structure, and the back side provided with filamentary hook and loop type fasteners for removably affixing said large imitated window frame to said interior wall, such that said unique background scene, said particular foreground scene and said plurality of small foreground objects can be seen through the central opening; and f. said large imitated window flames of said multiplicity of multi-layer imitated window scenery sets having substantially similar overall dimensions and being interchangeable for creating different combinations of window frame and scenery view;

g. whereby said multiplicity of multi-layer imitated window scenery sets can be used to form various real sized imitated windows on said interior walls of said room, where the frame and scenery view of the imitated windows can be interchanged as desired.

2. The wall decorating system as defined in claim 1 wherein said multiplicity of multi-layer imitated window scenery sets are made of plastic material.

3. The wall decorating system as defined in claim 1 wherein said multiplicity of multi-layer imitated window scenery sets are made of paper material.

4. A wall decorating system, comprising:

a. a multiplicity of multi-layer imitated window scenery sets, each set further comprising a large background scene-scape, a large foreground scene-scape, a plurality of small foreground scene-scapes, and a large imitated window frame;

b. said large background scene-scape having a real window sized and shaped configuration and having a front side and a back side, the front side painted with a background scene which is unique for said each set, and the back side provided with pressure-sensitive adhesive for removably affixing said large background scene-scape to an interior wall of a room;

c. said large foreground scene-scape having an outline of a particular foreground scene and having a front side and a back side, the front side painted with the particular foreground scene, and the back side provided with pressure-sensitive adhesive for removably affixing said large foreground scene-scape to said front side of said large background scene-scape;

d. said plurality of small foreground scene-scapes each having an outline of a particular small foreground object and having a front side and a back side, the front side painted with the particular small foreground object, and the back side provided with pressure-sensitive adhesive for removably affixing said each small foreground scene-scape to said front side of said large background scene-scape;

e. said large imitated window frame including a plurality of border pieces each having a front side and a back side, the front side painted with a respective portion of a unique window frame structure, and the back side provided with pressure-sensitive adhesive for removably affixing the piece to said front side of said large background scene-scape, the plurality of border pieces forming a large imitated window frame surrounding a large central opening, such that said unique background scene, said particular foreground scene and said plurality of small foreground objects can be seen through the central opening; and f. said large imitated window frames of said multiplicity of multi-layer imitated window scenery sets having substantially similar overall dimensions and being interchangeable for creating different combinations of window frame and scenery view;

g. whereby said multiplicity of multi-layer imitated window scenery sets can be used to form various real sized imitated windows on said interior walls of said room, where the frame and scenery view of the imitated windows can be interchanged as desired.

5. The wall decorating system as defined in claim 4 wherein said multiplicity of multi-layer imitated window scenery sets are made of plastic material.

6. The wall decorating system as defined in claim 4 wherein said multiplicity of multi-layer imitated window scenery sets are made of paper material.

7. A wall decorating system, comprising:

a. a multiplicity of multi-layer imitated window scenery sets, each set further comprising a large background scene-scape, a large foreground scene-scape, a plurality of small foreground scene-scapes, and a large imitated window frame;

b. said large background scene-scape having a real window sized and shaped configuration and having a front side and a back side, the front side painted with a background scene which is unique for said each set;

c. said large foreground scene-scape having an outline of a particular foreground scene and having a front side and a back side, the front side painted with the particular foreground scene;

d. said plurality of small foreground scene-scapes each having an outline of a particular small foreground object and having a front side and a back side, the front side painted with the particular small foreground object, and the back side provided with pressure-sensitive adhesive for removably affixing said each small foreground scene-scape to said front side of said large background scene-scape;

e. said large imitated window frame having a large central opening surrounded by a circumferential border which has a front side and a back side, the front side painted with a unique window frame structure, and the back side provided with filamentary hook and loop type fasteners for removably affixing said large imitated window frame to an interior wall of a room, the filamentary hook and loop type fasteners having a thickness which creates a clearance between the wall and the back side of the frame for inserting said large background scene-scape and said large foreground scene-scape therein, the back side of the frame further having a bottom tray for holding said large background scene-scape and said large foreground scene-scape, such that said unique background scene, said particular foreground scene and said plurality of small foreground objects can be seen through the central opening; and f. said large imitated window frames of said multiplicity of multi-layer imitated window scenery sets having substantially similar overall dimensions and being interchangeable for creating different combinations of window frame and scenery view;

g. whereby said multiplicity of multi-layer imitated window scenery sets can be used to form various real sized imitated windows on said interior walls of said room, where the frame and scenery view of the imitated windows can be interchanged as desired.

8. The wall decorating system as defined in claim 7 wherein said multiplicity of multi-layer imitated window scenery sets are made of plastic material.

9. The wall decorating system as defined in claim 7 wherein said multiplicity of multi-layer imitated window scenery sets are made of paper material.

10. A wall decorating system, comprising:

a. a multiplicity of multi-layer imitated window scenery sets, each set further comprising a large background scene-scape, a foreground scene-scape and a large imitated window frame;

b. said large background scene-scape painted with a background scene which is unique for said each set;

c. said foreground scene-scape having an outline of a particular foreground scene and having a front side and a back side, the front side painted with the particular foreground scene;

d. said large imitated window frame having a central opening surrounded by a circumferential border which has a front side and a back side, the front side painted with a unique window frame structure;

e. means for detachably connecting each said imitated window scenery set as a unit and removably affixing the unit to a wall of a building structure such that said unique background scenery and said particular foreground scene can be seen through the central opening of said unique imitated window frame; and f. said large imitated window frames of said multiplicity of multi-layer imitated window scenery sets being interchangeable for creating different combinations of window frame and scenery view;

g. whereby said multiplicity of multi-layer imitated window scenery sets can be used to form various imitated windows on said interior walls of said room, where the frame and scenery view of the imitated windows can be interchanged as desired.

11. The wall decorating system as defined in claim 10 wherein said multiplicity of multi-layer imitated window scenery sets are made of plastic material.

12. The wall decorating system as defined in claim 10 wherein said multiplicity of multi-layer imitated window scenery sets are made of paper material.

13. The wall decorating system as defined in claim 10 wherein said multiplicity of multi-layer imitated window scenery sets are made of wood material.

14. The wall decorating system as defined in claim 10 wherein said multiplicity of multi-layer imitated window scenery sets are made of fabric material.

15. The wall decorating system as defined in claim 10 further comprising at least one small foreground scene-scape having an outline of a particular small foreground object and having a front side and a back side, the front side painted with the particular small foreground object.

16. The wall decorating system as defined in claim 10 wherein said large imitated window frame includes a plurality of border pieces each having a front side and a back side, the front side painted with a respective portion of said unique window frame structure, the plurality of border pieces forming a large imitated window frame surrounding said large central opening.

17. The wall decorating system as defined in claim 10 wherein said back side of said large imitated window frame has a bottom tray for holding said large background scene-scape between said wall and said back side of said large imitated window frame.

18. The wall decorating system as defined in claim 10 wherein said means for detachably connecting each said imitated window scenery set as a unit and removably affixing the unit to a wall of a building structure includes pressure-sensitive adhesive material.

19. The wall decorating system as defined in claim 10 wherein said means for detachably connecting each said imitated window scenery set as a unit and removably affixing the unit to a wall of a building structure includes filamentary hook and loop type fasteners.

* * * * *